(12) United States Patent
Bisque et al.

(10) Patent No.: US 9,662,630 B2
(45) Date of Patent: May 30, 2017

(54) METHODS FOR SOLIDIFICATION AND STABILIZATION OF INDUSTRIAL BYPRODUCTS

(71) Applicant: ADA-ES, INC., Highlands Ranch, CO (US)

(72) Inventors: Ramon E. Bisque, Golden, CO (US);
Kenneth E. Baldrey, Denver, CO (US);
Robin M. Stewart, Arvada, CO (US);
George Rouse, Golden, CO (US);
Natalie Caro, Lakewood, CO (US)

(73) Assignee: ADA-ES, INC., Highlands Ranch, CO (US)

( * ) Notice: Subject to any disclaimer, the term of this patent is extended or adjusted under 35 U.S.C. 154(b) by 0 days.

(21) Appl. No.: 14/213,626

(22) Filed: Mar. 14, 2014

(65) Prior Publication Data

US 2014/0261089 A1    Sep. 18, 2014

Related U.S. Application Data

(60) Provisional application No. 61/798,419, filed on Mar. 15, 2013.

(51) Int. Cl.

| | |
|---|---|
| *C04B 18/08* | (2006.01) |
| *B01J 20/16* | (2006.01) |
| *C04B 18/02* | (2006.01) |
| *C04B 28/36* | (2006.01) |
| *B01J 20/04* | (2006.01) |
| *B09B 3/00* | (2006.01) |
| *C04B 22/06* | (2006.01) |
| *C04B 111/00* | (2006.01) |

(52) U.S. Cl.
CPC ............ *B01J 20/16* (2013.01); *B01J 20/041* (2013.01); *B01J 20/045* (2013.01); *B09B 3/0008* (2013.01); *C04B 18/021* (2013.01); *C04B 22/064* (2013.01); *C04B 28/36* (2013.01); *C04B 28/365* (2013.01); *B09B 2220/06* (2013.01); *C04B 2111/00767* (2013.01); *Y02W 30/91* (2015.05); *Y02W 30/92* (2015.05)

(58) Field of Classification Search
CPC ............................... C04B 18/08; B29C 67/00
USPC ........................................................ 264/117
See application file for complete search history.

(56) References Cited

U.S. PATENT DOCUMENTS

| | | | | |
|---|---|---|---|---|
| 2,564,690 | A | * | 8/1951 | Havelin ............... C04B 28/10 106/710 |
| 2,820,713 | A | | 1/1958 | Wagner |
| 2,942,993 | A | | 6/1960 | Handy et al. |
| 3,155,526 | A | | 11/1964 | Klein |
| 3,720,609 | A | | 3/1973 | Smith et al. |
| 3,785,840 | A | | 1/1974 | Minnick et al. |
| 3,859,799 | A | | 1/1975 | Jaco, Jr. |

(Continued)

OTHER PUBLICATIONS

International Search Report and Written Opinion for International Patent Application No. PCT/US2014/028138, mailed Sep. 4, 2014, 14 pages.

(Continued)

*Primary Examiner* — Paul Marcantoni
(74) *Attorney, Agent, or Firm* — Sheridan Ross P.C.

(57) ABSTRACT

An agglomerate is provided that can include an aluminosilicate (ash) base material and one or more of a binding agent or leach reduction agent. Each of the agglomerate and binding agent can include no more than about 25 wt. % cement.

33 Claims, 1 Drawing Sheet

(56) References Cited

U.S. PATENT DOCUMENTS

| | | |
|---|---|---|
| 3,962,080 A | 6/1976 | Dulin et al. |
| 4,058,500 A | 11/1977 | Vroom |
| 4,088,804 A * | 5/1978 | Cornwell ............... B28C 5/003 |
| | | 106/666 |
| 4,116,705 A | 9/1978 | Chappell |
| 4,193,810 A | 3/1980 | Ferm |
| 4,193,811 A | 3/1980 | Ferm |
| 4,207,115 A | 6/1980 | Boehme et al. |
| 4,226,630 A | 10/1980 | Styron |
| 4,229,295 A | 10/1980 | Krofchak |
| 4,243,563 A | 1/1981 | Ferm |
| 4,311,826 A | 1/1982 | McBee et al. |
| 4,629,509 A | 12/1986 | O'Hara et al. |
| 4,701,219 A | 10/1987 | Bonee |
| 4,761,182 A | 8/1988 | Whitescarver et al. |
| 4,853,208 A | 8/1989 | Reimers et al. |
| 4,950,409 A | 8/1990 | Stanforth |
| 5,034,203 A | 7/1991 | Audeh et al. |
| 5,037,479 A | 8/1991 | Stanforth |
| 5,284,636 A | 2/1994 | Goff et al. |
| 5,397,478 A | 3/1995 | Pal et al. |
| 5,482,550 A * | 1/1996 | Strait ................ C04B 16/087 |
| | | 106/677 |
| 5,512,702 A | 4/1996 | Ryan et al. |
| 5,527,982 A | 6/1996 | Pal et al. |
| 5,569,155 A | 10/1996 | Pal et al. |
| 5,678,234 A | 10/1997 | Colombo et al. |
| 5,877,393 A | 3/1999 | Webster |
| 5,898,093 A | 4/1999 | Vos |
| 6,235,204 B1 | 5/2001 | Castaldi et al. |
| 6,264,740 B1 | 7/2001 | McNulty, Jr. |
| 6,440,205 B1 | 8/2002 | Bailey et al. |
| 6,906,235 B2 | 6/2005 | Funakoshi et al. |
| 7,144,362 B2 | 12/2006 | Roper, Jr. |
| 7,578,881 B2 * | 8/2009 | Ramme ................ C04B 28/04 |
| | | 106/705 |
| 7,666,505 B2 | 2/2010 | Datta et al. |
| 7,776,294 B2 | 8/2010 | Hurley |
| 8,303,842 B2 | 11/2012 | Utter |
| 8,741,058 B1 * | 6/2014 | Easton ................ C04B 18/08 |
| | | 106/705 |
| 2003/0165359 A1 | 9/2003 | Chowdhury et al. |
| 2004/0018130 A1 | 1/2004 | Forrester |
| 2006/0094920 A1 | 5/2006 | Roper, Jr. |
| 2009/0118564 A1 | 5/2009 | McCullough et al. |
| 2013/0287653 A1 | 10/2013 | Joshi et al. |

OTHER PUBLICATIONS

"Technology Request, High value-added recycling technologies for the minerals collected from fly ash, " Enterprise Europe Network, 2014, 3 pages.

Joshi, "A Low-cost Rare Earth Elements Recovery Technology," Physical Sciences Inc., 2013, pp. VG-13-060-VG13-060-16.

Ekmann, "Rare Earth Elements in Coal Deposits—a Prospectivity Analysis, " Search and Discover Article #80270, 2012, 40 pages.

International Preliminary Report on Patentablility for International Patent Application No. PCT/US2014/028138, mailed Sep. 24, 2015, 10 pages.

* cited by examiner

METHODS FOR SOLIDIFICATION AND STABILIZATION OF INDUSTRIAL BYPRODUCTS

CROSS REFERENCE TO RELATED APPLICATION

The present application claims the benefits of U.S. Provisional Application Ser. No. 61/798,419, filed Mar. 15, 2013, entitled "Methods for Solidification and Stabilization of Industrial Byproducts", which is incorporated herein by this reference in its entirety.

FIELD

The disclosure relates generally to environmental stabilization of contaminated materials and particularly to environmental stabilization of contaminated materials using agglomeration.

BACKGROUND

Recent air pollution control technologies and wastewater treatments have altered residual byproduct streams at coal-fired power plants and created a need for new applications for beneficial use or safe disposal of these byproduct streams. Fly ash from coal-fired power plants, for example, has been extensively employed as a substitute for Portland cement in concrete. New regulations and air pollution control technologies may fundamentally alter the bulk material properties of fly ash to create entirely new byproduct categories and thereby reduce the amount of fly ash byproduct that can be beneficially used for concrete. Sorbents, such as activated carbon, which may be injected into power plant flue gas to adsorb vapor-phase mercury, and dry sorbent injection ("DSI") chemicals injected into the duct for acid gas control will be admixed with combustion fly ash and the resulting new materials will present entirely different aggregate characteristics including particle size, density, chemical makeup, pH, heavy metals mobility, reactivity with concrete additives and others. In particular, fly ash with activated carbon above minimal levels is not suitable for concrete admixture due to reaction of the spent activated carbon with concrete air entrainment chemicals. These changes create a need for alternative byproduct uses for fly ash and in certain situations new fly ash disposal methods.

New regulations in the United States, namely Mercury and Air Toxics Standards or MATS, require control of acid gas discharge from new and existing power plants. The regulations will require control of HCl to as high as 97% removal. Many plants will inject alkaline sorbents, such as hydrated lime, sodium bicarbonate or trona, into the duct as acid gas sorbents. The unreacted alkaline sorbents along with the products of reaction will be intermixed with the fly ash. Variable content of sodium and calcium sorbents will make use of this fly ash for concrete difficult. Sodium sorbents additionally may increase concentrations of arsenic, selenium and chlorides in the fly ash, creating leachability concerns if the ash were to be landfilled. The arsenic, selenium, $SO_2$, $SO_3$, and HCl that had previously been emitted to the atmosphere as a stack gas will now be shifted to the solid waste stream as a result of tighter air pollution control. As a result of these changes, there is an emerging need for large-scale beneficial uses for fly ash/dry alkaline sorbent byproduct stream other than concrete admixture.

Waste water discharge limits for a variety of pollutants from coal-fired plant flue gas desulfurization scrubbers ("FGD") are being revised to reduce harmful pollution to surface waterways. It is expected that individual point discharges, rather than aggregate plant discharge, will now be monitored and controlled, thereby creating a need to minimize point source water discharge in order to comply with the limits. New discharge limits for selenium in waste water are especially challenging due to the very soluble selenates, $SeO_4$, that cannot be controlled by traditional chemical or physical water treatment. Emerging technologies such as bio-reactors are under development to allow polishing the water to meet new Effluent Limit Guidelines, but these are expensive and unproven.

There is a growing awareness and acceptance that flue gas desulfurization ("FGD") scrubber wastewater treatment and treated water discharge to surface water bodies may no longer be viable. Entirely new processes around Zero Liquid Discharge ("ZLD") of waste water to surface water bodies are being developed. Some of these treatment processes will dewater solids from FGD wastewater by spray dryer or other evaporators. This will eliminate water discharge but produce an entirely new and potentially hazardous residual sludge for disposal as a solid waste stream. These solids will have high concentrations of chlorine, bromine and soluble trace metals, in particular selenium.

Powder River Basin fly ash is high in calcium, pozzolanic and can be used as a Portland cement substitute. It is known in the art to form a cementitious material with fly ash and Portland cement that can be added to hazardous solids as a binder and encapsulant. Such mixtures after hardening for a month to final strength will significantly reduce hazardous metal leachability (mobility). However, Portland cement is expensive. Additional greenhouse gas $CO_2$ is generated during limestone calcining to make Portland cement. The concrete reactions are relatively slow and strength is poor if high percentages of filler or diluents such as hazardous wastes or activated carbon in fly ash are incorporated into the aggregate.

There are also known geopolymers that are alkali-activated binders for aluminosilicate base materials such as kaolinites, silicates, bentonite and fly ash, as examples. These have also been tested and are known for Solidification/Stabilization ("S/S") of hazardous solids. However, many such geopolymers require some heating or pressure or both to form the polymers. The geopolymers are typically very caustic NaOH or KOH mixtures with handling difficulties. Most existing geopolymers are also sensitive to the incorporation of non-polymer fillers that can disrupt the structure and bonding.

SUMMARY

These and other needs are addressed by the various aspects, embodiments, and configurations of the present disclosure. The disclosure relates to various aluminosilicate compositions formed into agglomerates.

An agglomerate can include an aluminosilicate ash base material and a binding agent. The binding agent commonly includes no more than about 25 wt. % cement.

An agglomerate can include an aluminosilicate base material and a polysulfide binding agent. The agglomerate can include no more than about 2.5 wt. % cement.

An agglomerate can include an aluminosilicate base material and a leach reduction additive.

The agglomerate can include about 50 wt. % or more of the aluminosilicate ash base material.

The aluminosilicate base material can include a Class F and/or Class C fly ash, at least about 500 ppm heavy metals, at least about 1 ppm halogen-containing compounds, unreacted limestone or lime from flue gas desulfurization, at least about 1 wt. % activated carbon, and a flue gas desulfurization solid from the reaction of a flue gas desulfurization agent and an acid gas.

The flue gas desulfurization solid can be one or more of an alkali and/or alkaline earth metal sulfate, an alkali and/or alkaline earth metal sulfite, an alkali and/or alkaline earth metal nitrate, an alkali and/or alkaline earth metal nitrite, and an alkali and/or alkaline earth metal halide.

The binding agent can be an alkali and/or alkaline earth metal polysulfide and/or organic polysulfide. The agglomerate commonly includes at least about 0.1 wt. % but no more than about 20 wt. % binding agent.

The agglomerate can include at least about 5 wt. % added base stabilizer.

The agglomerate can include at least about 0.1 wt. % but no more than about 5 wt. % of a set retardant.

The leach reduction additive can be one or more of an alkane, fatty acid ester, stearic acid, oleic acid, palmitic acid, an ester of a trihydroxy alcohol with one or more of stearic acid, oleic acid, and palmitic acid, an alkene, a cycloalkane, a cellulose, and silicone.

The leach reduction additive can include a long chain alkane hydrocarbon with 20 or more carbons and is applied at least about 0.001 wt. % but no more than about 5 wt. % of the agglomerate.

For leach reduction additive mixing, the agglomerate can include at least about 0.001 wt. % of an emulsifying agent that is at least one of a latex, sugar ether, quaternary amine, an ammonium salt of a sulfated fatty alcohol ethoxylate, an ethoxylated primary amine, a nonylphenol, a lignin sulfonate, and glycerin.

The agglomerate can include at least about 0.001 wt. % of a reducing agent.

The method for solidifying a fly ash polymer can include the steps of:

(a) receiving an aluminosilicate fly ash separated from a waste gas stream; and (b) contacting the aluminosilicate fly ash with water and at least one of a binding agent and a leach reduction additive to form an agglomerate.

The contacting step can include the substeps of:

(a) contacting the long chain alkane hydrocarbon with a heated alkane-containing liquid solvent, the alkane in the alkane-containing liquid solvent having a chain length of 16 or less to form a liquid alkane mixture;

(b) while mixing, contacting the alkane mixture with water to form an aqueous alkane mixture;

(c) while mixing, contacting the aqueous alkane mixture with an emulsifying agent to form a liquid mixture;

(d) contacting the liquid mixture with the aluminosilicate fly ash to form an aggregate mixture; and (e) curing the aggregate mixture to form the agglomerate.

The agglomerate is commonly produced by treating fly ash, such as pozzolanic fly ash (particularly Powder River Basin (PRB) fly ash), with additives, such as a mixture of calcium polysulfide, hydrated lime, and water. Commercial concrete set inhibitors or non-aqueous solvents, including acetone and alcohol, can be added to alter setting time. The aggregate can be rapid setting to form the agglomerate and develop high compressive agglomerate strength in only 1 to 3 days.

The agglomerate can be formed into pellets. The agglomerate can include two or more layers. An inner layer includes a leachable waste solid and an outer layer surrounding the inner layer includes the aluminosilicate fly ash formed with the binding agent and/or leach reduction additive. The aluminosilicate fly ash can be contacted with a spray solution of water to form substantially homogeneous pellets. The spray solution can include a liquid waste slurry.

The present disclosure can provide a number of advantages depending on the particular configuration. The agglomerate can be formed from inexpensive bulk raw materials that can be used to solidify and stabilize (S/S) the fly ash solid wastes. The agglomerate can be formed using simple mixing techniques and does not require heating or applied pressure to develop strength and structure. The solidification and stabilization method can be inexpensive, applicable to large scale byproduct streams and help to avoid waste water discharge to surface waterways. Agglomerate solidification can be accomplished full-scale through use of well-known industrial equipment including pelletizer, high shear mixer or pug mill. Agglomerates can also be formed in-situ by treating a landfilled or layered aluminosilicate base material such as fly ash with binder. The agglomerate can exhibit rapid strength development, high density, low permeability and reduced leachability of hazardous contaminants contained within the flay ash. It can be stable in both water and acidic environments. Leach reduction additives, including alkanes, can be added to the agglomerates to reduce water penetration and leaching of harmful pollutants. They can exhibit low permeability as evidenced by negligible water penetration when soaked for extended periods. Tests have shown that high chloride solids (up to 40,000 ppm chlorides) can be safely incorporated into the solid matrix of the agglomerate. The agglomerates can be used for S/S of other process wastes, including produced water sludges and drilling wastes from oil and gas wells. The agglomerates can be useful for many concrete applications that traditionally have utilized Portland cement. The agglomerate structurally can be expected to be 3D inorganic polymers with unique properties relative to Portland cement concrete and existing geopolymers. The agglomerates have been found to be able to tolerate activated carbon or evaporated FGD solids into the matrix with minimal effect on strength development.

There are multiple uses of the agglomerate of this disclosure including solidification and stabilization of non-traditional power plant byproduct streams, immobilization of heavy metals and chlorides, fixation of evaporated residues from FGD blowdown or oil and gas produced water, formation of uniform disposable solids from drill cuttings from oil and gas wells and use of the disclosed fly ash polymer as concrete replacement or specialized cementitious solid in geotechnical applications.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

"Agglomerate" refers to an assemblage or collection of particles in a coherent, particularly a rigid or substantially rigid, mass.

"Aggregate" refers to a loosely coherent assemblage or collection of particles. An aggregate is typically a precursor to an agglomerate.

"Aluminosilicate" are compositions, such as minerals, composed of aluminum, silicon, and oxygen, plus countercations. They are a major component of kaolin and other clay minerals. Andalusite, kyanite, and sillimanite are naturally occurring aluminosilicate minerals that have the composition $Al_2SiO_5$. Calcium aluminosilicate, an aluminosilicate compound with calcium cations, most typically has formula $CaAl_2Si_2O_8$. Sodium aluminosilicate is an acid salt comprising sodium, aluminum, silicon and oxygen.

An "alkane" is a saturated hydrocarbon. Alkanes consist only of hydrogen and carbon atoms, all bonds are single bonds, and the carbon atoms are not joined in cyclic structures but instead form an open chain. They have the general chemical formula $C_nH_{2n+2}$. Alkanes belong to a homologous series of organic compounds in which the members differ by a molecular mass of 14.03 u (mass of a methanediyl group, —$CH_2$—, one carbon atom of mass 12.01 u, and two hydrogen atoms of mass≈1.01 u each).

An "alkene", "olefin", or "olefine" is an unsaturated chemical compound containing at least one carbon-carbon double bond. The simplest acyclic alkenes, with only one double bond and no other functional groups, known as mono-enes, form a homologous series of hydrocarbons with the general formula $C_nH_{2n}$. They have two hydrogen atoms less than the corresponding alkane (with the same number of carbon atoms).

"Ash" refers to the residue remaining after complete or partial combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

A "base stabilizer" is a material that can take in hydrogen ions and protons.

A "binder," refers to a material that promotes cohesion of aggregates or particles. Binders are typically solids, semi-solids, or liquids. Non-limiting examples of binders are polymeric materials, tar, pitch, asphalt, wax, cement water, solutions, dispersions, powders, silicates, gels, oils, alcohols, clays, starch, silicates, acids, molasses, lime and ligno-sulphonate oils, hydrocarbons, glycerin, stearate, polymers, wax, or combinations thereof. The binder may or may not chemically react with the material being agglomerated. Non-limiting examples of chemical reactions include hydration/dehydration, metal ion reactions, precipitation/gelation reactions, and surface charge modification.

"Carbonaceous" refers to a carbon-containing material, particularly a material that is substantially rich in carbon.

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

A "cycloalkane" is a type of hydrocarbon compound that has one or more rings of carbon atoms in the chemical structure of its molecule.

An "emulsifying agent" affects the dissolution of immiscible substances, such as oil and water, by breaking up the immiscible substance (e.g., the oil) so that it can disperse more evenly throughout the other substance (e.g., the water).

A "heavy metal" is a member of a loosely defined subset of elements that exhibit metallic properties. It mainly includes the transition metals, some metalloids, lanthanides, and actinides. Toxic heavy metals include antimony, arsenic, barium, beryllium, cadmium, lead, mercury, osmium, thallium, vanadium, and radioactive metals.

"Lime" is a general term for calcium-containing inorganic materials, in which carbonates, oxides and hydroxides predominate. Strictly speaking, lime is calcium oxide. "Hydrated lime" is calcium hydroxide and is the form most commonly used in dry sorbent injection.

A "particle" refers to a solid, colloid, or microencapsulated liquid with no limitation in shape or size.

"Particulate" refers to fine particles, such as fly ash, unburned carbon, soot and fine process solids, typically entrained in a gas stream.

A "polysulfide" is a class of chemical compounds containing chains of sulfur atoms. There are two main classes of polysulfides: anions and organic polysulfides. Anions have the general formula $S_n^{2-}$. These anions are the conjugate bases of the hydrogen polysulfides, $H_2S_n$. Organic polysulfides generally have the formulae $RS_nR$, where R=alkyl or aryl.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

"Reducing agent", "reductant" or "reducer" refers to an element or compound that donates one or more electrons to another species or agent this is reduced. In the reducing process, the reducing agent is oxidized and the other species, which accepts the one or more electrons, is reduced. More specifically, the reducer is an electron donor and the oxidant is an electron acceptor or recipient.

The terms "remove" or "removing" include the sorption, precipitation, adsorption, absorption, conversion, deactivation, decomposition, degradation, and/or neutralization of a target material.

A "set retardant" is a material that prevents, retards, delays, or inhibits the adhering of aggregates or particles into an agglomerate.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
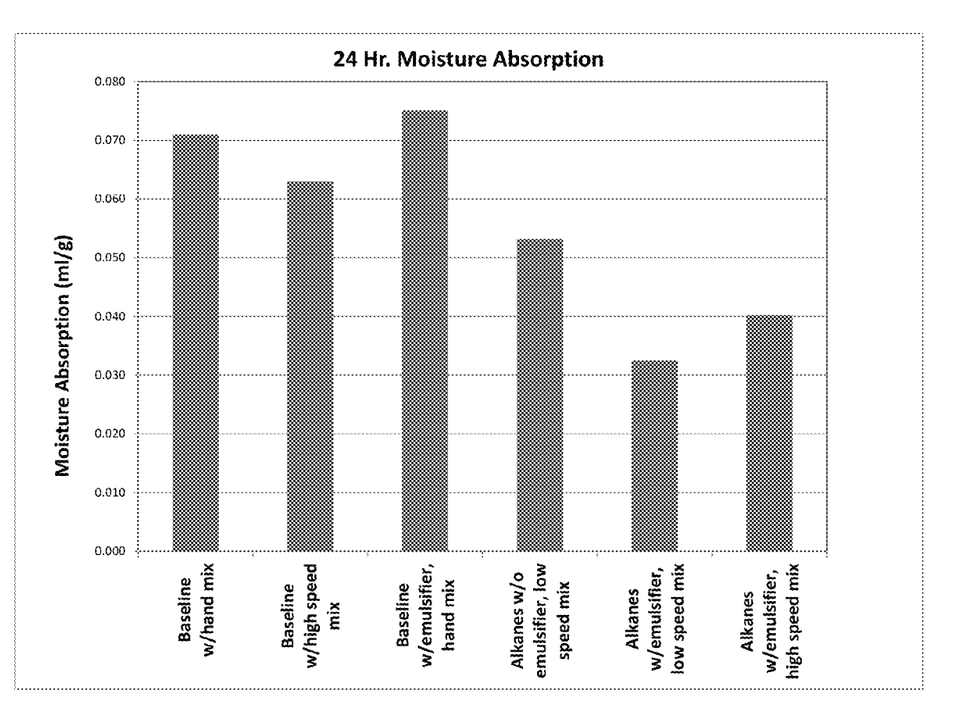
FIG. 1 is a plot of moisture absorption (ml/g) (vertical axis) against various tested sample descriptions (horizontal axis).

An agglomerate combines ash, particularly fly ash, as a base material (or primary constituent) and an optional binding agent. The agglomerate can include other constituents, including one or more of a heavy metal, sorbent such as (spent) activated carbon, evaporated flue gas desulfurization ("FGD") solids (e.g., a reaction product of limestone or lime slurry with acid gases), hydrated lime and other alkaline calcium reactants injected for dry sorbent injection ("DSI") and resulting products of reaction with acid gases, alkaline sodium reactants (trona, sodium bicarbonate, sodium carbonate, and others) injected for DSI and resulting products of reaction with acid gases, hydrated lime or other alkaline calcium slurry used in spray dryers and resulting products of reaction with acid gases, a base stabilizer such as hydrated lime, set retardant, a leach reduction additive, and other materials. The agglomerate and binding agent are commonly substantially free of cement (e.g., Portland cement). Each commonly comprises no more than about 25 wt. % cement, more commonly no more than about 20 wt. % cement, more commonly no more than about 15 wt. % cement, more commonly no more than about 10 wt. % cement, more commonly no more than about 5 wt. % cement, more commonly no more than about 2.5 wt. % cement, more commonly no more than about 1 wt. % cement, more commonly no more than about 0.5 wt. % cement, and even more commonly no more than about 0.1 wt. % cement. The agglomerate can have rapid strength development, high density, low permeability, and reduced leachability of hazardous contaminants.

The Base Material

The agglomerate includes an aluminosilicate base material. A typical base material is Powder River Basin ("PRB") ash (e.g., fly ash). The ash can be Class F and/or Class C fly ash. Class F fly ash and Class C fly ash are defined by ASTM C618. Class F fly ash is pozzolanic in nature, and contains less than 20% lime (CaO). Class C fly ash generally contains more than 20% lime (CaO). Alkali ($Na_2O$ and $K_2O$) and sulfate ($SO4$) contents are generally higher in Class C fly ashes compared to Class F fly ashes. The chief difference between these classes is the amount of calcium, silica, alumina, and iron content in the ash. The ash can also be a sodium DSI ash. This ash may form an agglomerate with the sodium acting as a catalyst for aluminisilicate reactions, similar to adding sodium hydroxide as an alkali activator in conventional geopolymers. Other aluminosilicate sources, such as natural clays (kaolinite and bentonite), may be additionally or alternatively used. The agglomerate commonly includes about 50 wt. % or more, more commonly about 65 wt. % or more, and even more commonly about 75 wt. % or more of the base material. Where both Class C and F fly ashes are used, the base material is generally 50% or less of the Class F fly ash as base material compositions of more than about 50% Class F fly ash tend to have a slower set time and weaker polymer structures.

The base material can include other constituents. For example, the base material can include one or more heavy metals removed from a flue or waste gas. Commonly, the base material includes at least about 500 ppm but no more than about 20000 ppm heavy metals. The heavy metals are commonly present as metal oxides. The base material can include halogen-containing compounds, such as bromides, iodides, and chlorides. Commonly, the base material includes at least about 1 ppm but no more than about 40,000 ppm and more commonly from about 10 to about 10000 ppm halogen-containing compounds. The base material can include a (spent) sorbent, such as activated carbon, previously introduced into a waste gas to remove a target contaminant such as mercury. Commonly, the base material includes at least about 0.5 wt. % but no more than about 50 wt. % and more commonly from about 1 to about 5 wt. % sorbent. In a TOXECON™ configuration the carbon content can be higher than 50% depending upon electrostatic precipitator ("ESP") efficiency and carbon injection rate. The base material can include an evaporated FGD solid from the reaction of an FGD agent and an acid gas, such as an alkali or alkaline earth metal sulfate (e.g., gypsum), an alkali or alkaline earth metal sulfite (e.g., calcium sulfite and sodium sulfite), an alkali or alkaline earth metal nitrate, an alkali or alkaline earth metal nitrite (e.g., calcium nitrite and sodium nitrite), and an alkali or alkaline earth metal halide (e.g., sodium or calcium chloride). Commonly, the base material includes at least about 1 ppm but no more than about 50000 ppm and more commonly from about 1000 to about 25000 ppm evaporated FGD solids. Finally, the base material can include unreacted lime or limestone from FGD. Unreacted limestone/lime and reaction products include not only limestone or lime but also calcium sulfate, calcium nitrate, calcium sulfite, calcium nitrite, calcium chloride, and other products. Commonly, the base material includes at least about 2 wt. % but no more than about 30 wt. % calcium.

The Binding Agent

The binding agent can be any suitable binder. A common binding agent is an alkali or alkaline earth metal (e.g., calcium) polysulfide (typically of lime-sulfur agricultural grade). Other sulfides, including sodium polysulfide ($NaS_x$ where X>1) and chemical grade calcium sulfide ($CaS_x$ where X>1), may also be used. In some applications, organic polysulfides may also be used. Examples include organic polysulfides generally have the formula $RS_nR$, where R=alkyl or aryl.

As noted, the binding agent is optional. In the absence or substantial absence of the binding agent, some base materials can be blended with water to make the agglomerate.

The agglomerate typically contains at least about 0.1 wt. % and more typically at least about 0.5 wt. % but typically no more than about 20 wt. % and more typically no more than about 10 wt. % binding agent (e.g., alkali metal or alkaline earth metal polysulfides).

The binding agent can be contacted with the base material in the presence of water. The binding agent can be in the form of an aqueous solution of the binding agent. The aqueous solution usually contains from about 5 to about 30 wt. %, more usually from about 20 to about 30 wt. %, and even more usually from about 20 to about 30 wt. % of the binding agent.

The Base Stabilizer

Other additives may be incorporated to improve the mix for a particular application. A base stabilizer, such as hydrated lime or quicklime, may be added (in addition to any spent limestone or lime already present in the base material) as a stabilizer or to increase final pH. The use of fly ash containing hydrated lime and reaction products of hydrated lime injection for dry sorbent injection (DSI) to control acid gases can be highly advantageous. Heretofore, fly ash with dry sorbent residue has been unusable for concrete admixture or for incorporation into geopolymers.

Typically, the agglomerate includes at least about 1 wt. % and more typically at least about 5 wt. % but typically no more than about 30 wt. % and more typically no more than about 20 wt. % added base stabilizer.

The Set Retardant

Set retardants can be added to the mix to control the workability of the mixture for various applications. In particular a set retardant is useful to prevent flash setting. In some embodiments, acetone or alcohol can be used to alter settling times. Commercially available set retardants used in the concrete industry may also be used at levels recommended by the manufacturer.

Typically, the agglomerate includes at least about 0.1 wt. % and more typically at least about 0.5 wt. % but typically no more than about 5 wt. % and more typically no more than about 2.5 wt. % added set retardant, or levels recommended by the manufacturer if a commercial product.

The Leach Reduction Additive

Leach reduction additives, such as waterproofing additives, can be added to the mix to substantially eliminate, inhibit, or retard water penetration into the agglomerate or agglomerate matrix. While not wishing to be bound by any theory, it is believed that the leach reduction additive is not only hydrophobic but also plugs pores in the agglomerate, thereby blocking liquid access to the agglomerate interior and altering leachability of included constituents by changing pore dynamics of the agglomerate. An example of the waterproofing and reduced leachability effect of the leach reduction additive can be seen by including a water soluble iodide salt in treated and untreated agglomerates. The water soluble iodide is readily leached from agglomerates containing no leach reduction additive but retained by agglomerates containing the leach reduction additive. Other leaching comparisons can be made, including water soluble chloride salts. The introduction of the leach reduction additive does not appear to interfere with the role of the base material.

Exemplary leach reduction additives include liquid alkanes (including kerosene, paraffin wax or oil, and lamp oil), fatty acid ester (particularly glyceryl fatty acid ester), stearic, oleic, or palmitic acid, esters of a trihydroxy alcohol with one or more of the foregoing acids, alkenes, cycloalkanes, methyl cellulose, and silicone. Exemplary agents include long chain alkane hydrocarbons (paraffin wax) with 20 or more carbons that are solids at room temperature (LCH). The leach reduction additive is applied at commonly at least about 0.001 wt. %, more commonly at least about 0.010 wt. %, and more commonly at least about 0.05 wt. % but commonly no more than about 5 wt. %, more commonly no more than about 2.5 wt. %, and even more commonly at no more than about 1 wt. % of the agglomerate.

In some applications, the leach reduction additive is added to the base material alone or optionally along with water, without (or in the absence or substantial absence of) the binding agent. Generally, the binding agent results in a stronger agglomerate as measured in terms of compressive strength. However, some class C fly ashes in particular create a strong agglomerate with water alone, without the optional binding agent.

The Emulsifying Agent

An emulsifying agent (anionic, cationic, amphoteric, and/or non-ionic) may be added to prevent phase separation of the leach reduction additive (e.g., alkanes) from water and to promote uniform distribution of leach reduction agent. Some emulsifying agents, particularly anionic and cationic emulsifying agents, are incompatible with aqueous alkali or alkaline earth metal polysulfides. The emulsifying agent is typically dispersed particles of organic polymers. Exemplary emulsifiers for this purpose include latexes, sugar ethers, quaternary amines, an ammonium salt of a sulfated fatty alcohol ethoxylate, ethoxylated primary amines, nonylphenols, lignin sulfonate, or glycerin. Exemplary emulsifier for this purpose is glycerin.

Typically, the agglomerate comprises at least about 0.001 wt. %, more typically at least about 0.010 wt. %, and more typically at least about 0.05 wt. % but typically no more than about 10 wt. %, more typically no more than about 5 wt. %, and even more typically no more than about 2.5 wt. % of the emulsifying agent.

Method of Preparing the Agglomerate

The various constituents are contacted with one another and water. Typically, the agglomerate comprises from about 2 to about 35 wt. % and more typically from about 5 to about 25 wt. % water with the remainder being the solid constituents.

When a solid leach reduction additive, such as a long chain alkane hydrocarbon (paraffin wax) with 20 or more carbons (LCH) (that is a solid at room temperature), is employed, it is dissolved in a suitable solvent, such as a short chain alkane solvent of chain length 16 or less (SCH). The mass ratio of short chain to long chain alkanes, SCH:LCH, is typically in a range of about 5:1 to about 40:1 and more typically of about 10:1 to 20:1. The liquid alkane mixture can be added to the water, and the liquid ingredients added into the dry ingredients with stirring. Gentle heating can be applied to no more than about 80° C. to dissolve the LCH more rapidly. As will be appreciated, other organic solvents may be used to solubilize the alkane waxes including diesel fuel, acetone, an alcohol kerosene and fatty acid esters including glycerin.

Mixing can be important in preparing the agglomerate. Without mixing, the leach reduction additives can separate before the agglomerate is formed. When the base material is first wetted with the leach reduction additive, water is shed. When the base material is wetted with water prior to addition of the leach reduction additive, the leach reduction additive will separate from the mixture and form a distinct phase. Use of an emulsifying agent with light mixing can cause water to react and the leach reduction agent desirably to become trapped in pores.

The speed of mixing can also affect agglomerate formation. Testing demonstrates that a lower speed mixing, on the order of hand-mixing or a low-speed setting of a hand mixer, can provide favorable results. Higher speed mixing can lead to somewhat less favorable results. It is theorized that higher speed mixing leads to separate the constituents, while lower speed mixing encourages a thorough blending that leads to a stronger polymer.

Typically the rotational speed of the mixing blade(s) is at least about 50 rpm, more typically at least about 500 rpm, and even more typically at least about 1,000 rpm but typically no more than about 40,000 rpm, more typically no more than about 30,000 rpm, and even more typically no more than about 20,000 rpm.

The enthalpy of polymerization, as seen in temperature change after mix preparation, is not commonly altered by the presence of the organics.

Pelletization

Pellets or manufactured agglomerate may be formed using the formulations of this disclosure, which incorporate wastes in a fly ash polymer matrix. Pelletization has certain advantages for disposal of waste residuals. In particular, the method is directed to disposal or beneficial use of high salt brine residues from FGD evaporative processes. Pellets can be stored and transported dry via conveyor. Fugitive dusting of powdered materials can be avoided. A higher percentage of waste solids can be incorporated into the agglomerate compared to monolithic encapsulation. Pellets formed from waste solids can be utilized for beneficial applications such as flowable fill in landfills with uneven subsidence or as road and other geotechnical fill if long-term durability and leaching characteristics are satisfactory and if regulations and material specifications allow such use.

Pelletization is a well-known art using large-scale equipment such as rotary pan pelletizers or high shear mixers. Irregular agglomerates may also be formed by direct spray of binding agent solution on dry matrix materials such as fly ash with residual brines followed by mechanical size separation.

Certain aspects of pelletization are especially suited to disposal of salt wastes. It has been discovered that a two-layer pellet can be manufactured with an inner layer consisting of highly leachable waste solids, such as soluble brine salts, surrounded by an outer encapsulating layer of impermeable fly ash polymer formed with the bind agent and optionally leach reduction additive(s). Alternatively, the dry ingredients can be pre-mixed and contacted with a spray solution of water and liquid additives to form homogeneous pellets.

A third pelletization method is to directly spray contact liquid waste slurry with dry matrix materials. This option will be advantageous for disposal of concentrated brine waste liquid from flue gas desulfurization waste water where zero liquid discharge (ZLD) is to be achieved for overall scrubber wastes. This can be spray contacted with the dry mix of this disclosure, typically Class C or Class F fly ash with hydrated lime in a rotary contactor, such as a pan pelletizer or high shear mixer, or directly on a landfill layer. A liquid binding agent can also be sprayed onto the dry base material or dry aggregate constituents. The binding agent is typically an aqueous calcium polysulfide solution. The binding agent can be pre-mixed with the waste liquid or sprayed separately if there are reactive components in the waste liquid that would react with the binding agent before contact with the dry pellet ingredients.

Further leach reduction additives can be added to the liquid spray as disclosed elsewhere. Preferred leach reduction additives include long-chain alkane hydrocarbon wax of length $C_{20}$ or longer (paraffin wax) solubilized in shorter chain liquid alkane hydrocarbons of $C_{14}$ to $C_{16}$ length.

Emulsifying agents can be optionally added to the liquid spray to disperse the alkanes.

Applications

Solidification and Stabilization

Large byproduct streams from coal-fired plants, such as FGD blowdown solids or DSI/ash, require efficient and reliable methods of contact of chemical binding agent with the solids. For example, a typical 500 MW plant may produce continuously up to 25,000 to 40,000 lbs/hr of fly ash/DSI. Treatment of this large volume can be accomplished in various ways by known industrial equipment and processes. Some smaller byproduct streams such as carbon/ash mixture from a TOXECON™ configuration can also have issues with disposal in a landfill. TOXECON™ is an Electric Power Research Institute ("EPRI") process with a particulate control configuration of the plant electrostatic precipitator ("ESP") followed by a fabric filter baghouse. Sorbents for control of acid gases or vapor mercury are injected between the ESP and baghouse.

Solidification is possible full-scale by rotary pelletization (agglomeration) where the liquid binding agent (e.g., calcium polysulfide) is spray contacted with solids in a rotary drum. The size of the pellets is controlled by material throughput, angle of drum, and rotation speed. Granular or large pellets with rapid strength development can be produced continuously. Such pelletizers are available to treat an entire plant byproduct stream.

The mixture ingredients may be introduced by various methods for pelletization. For example, dry materials including the reactive fly ash base material and industrial solids to be incorporated for solidification can be mixed prior to pelletization and the liquid binding agent or liquid byproduct materials can be added as a spray contact during pelletization. Residual waste water from sludges can be used with binding agent in the spray. Alternatively, the binding agent can be a powdered solid as well and the liquid spray can be waste water or mix water added at specific flow rates.

A solid mixture of reactive aluminosilicate base material and powdered binding agent can be pre-mixed and shipped to a geographically remote application site where mixture with the byproduct solids and water spray contact is made.

Pelletized solids can be used beneficially for structural fill applications or as an aggregate provided any harmful contaminants are immobilized. Alternatively, they can be landfilled. Pellets can be transported for landfill as a low dusting dry, pourable solid. They will spread and compact with uniform shear strength and fill in voids in the landfill. Another example of large-scale solidification is use of an industrial pug mill. This can be used with the same ingredient mix described for pelletization to produce a cementitious poured layer. In this application, the control of set and other aspects of the batch chemistry similar to concrete will be important. A unique advantage we have found to date is that development of high compressive strength proceeds rapidly compared to Portland cement concrete. There are many non-waste applications for which this would be an advantage.

Applications of the unique formed fly ash polymer material outside the waste industry and coal-fired power plants byproduct applications are included in the disclosure. These may include geotechnical fast set placements, landfill cap or liner and others.

The solids of this disclosure can also be used for S/S of other process wastes, including produced water sludges and drilling wastes from oil and gas wells such as the Marcellus and Utica plays. Drill cuttings and other waste for shale gas wells are now required to be entirely landfilled or treated in Pennsylvania. There is a growing trend in the industry to minimize use of fresh water in part because it is expensive and problematic to treat and in part because there is limited water available. Drilling process and produced waters are recycled up to 10 times. Water is also disposed of by evaporation, leaving the solids as residue. These solids can contain high chlorides, organics, bromides and leachable metals. All drilling waste is now classified as industrial waste and must be sent to landfill. It is highly variable in solids, consistency and water. Typically it is dewatered and the water is recycled. Landfills must monitor and actively manage the amount of drilling wastes put on landfill to avoid subsidence, etc.

Solidification of drilling wastes and produced water sludges to transportable small aggregate solids prior to landfill can have advantages. It immobilizes many of the metals and halogens and it forms an easily transported and uniform strength fill so that the landfill can avoid premature subsidence and failure or expansion of landfill caps and liners.

An impermeable landfill cover may be formed by spray of binding agent, typically calcium polysulfide solution, onto a layered matrix material such as Class C fly ash or other coal combustion materials such as spray dryer absorber (SDA) ash, FGD gypsum, sodium or calcium enriched fly ash resulting from dry sorbent injection (DSI). Landfill daily cover can reduce moisture infiltration into landfill and increase compressive strength to allow heavy equipment traffic on the covered area.

An outdoor cover formed in place will preferably be formed to final strength within hours so that inclement weather does not disrupt the process and heavy equipment has ready access. Fly ash polymers formed with Class C ash and calcium polysulfide exhibit rapid set to near final strength, compared to Portland cement concretes. If necessary, the time to layer hardening can be reduced by optional set accelerator such as an alkali metal or alkaline earth metal (e.g., sodium) metasilicate and/or orthosilicate. Leach reduction additives, as previously disclosed, could be optionally added. Fibrous materials may be incorporated to reduce expansion cracking.

Landfill or area capping can also be accomplished by spray or flood coverage with pre-mixed ash polymer slurry using the materials and compositions of this disclosure.

In addition to landfill cover, other applications for in-situ rapid formed large area cover are within the scope of this disclosure.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Example 1

Mortar Compressive Strength

Mortar samples were prepared as 2" cubes using Powder River Basin fly ash, calcium polysulfide ($CaS_x$) as 28% solution and hydrated lime powder. No additional water other than the $CaS_x$ solution was needed to form a slurry consistency. Sample A-1 set time to hardness was less than 1 hour. A-2 and A-3 took progressively longer set time to hardness. The samples were cured for 3 days then tested for compressive strength. Compressive strength tests were run according to ASTM C109 for mortar cements to determine compressive strength category and the effect of $CaS_x$/lime ratios on compressive strength. Results were as follows:

| Sample | Ash:CaSx:Lime (approx.) | Compressive Strength |
|---|---|---|
| A-1 | 8:1:1 | 3740 psi |
| A-2 | 8:0.7:1 | 1214 psi |
| A-3 | 8:0.3:1 | 459 psi |

Results of these initial tests were that the mixtures reached initial hardness within hours, compressive strength was higher than cement-based mortars and increasing lime/additive ratio reduced compressive strength.

Example 2

Acid and Water Stability

Fly ash polymers using PRB fly ash and calcium polysulfide or calcium polysulfide and hydrated lime were prepared by forming a slurry mixture in a mold, then allowed to cure to full hardness over a period of several days to a week. The formed solid was then soaked in a strong acetic acid bath at pH 3.5. The samples containing lime did react in the acetic acid and visible loss of solids from the surface took place. The mixtures with calcium polysulfide and fly ash only retained physical integrity after the acid soaking. The test mix starting at pH 3.5 and equalized to pH 5.

Other prepared samples were soaked continuously in neutral pH water and retained structural integrity with negligible moisture penetration into the solid.

Example 3

Leach Reduction

Leach reduction agents were added to the fly ash polymers during initial mixing to reduce moisture penetration. Exemplary agents include long chain alkane hydrocarbons (paraffin wax) with 20 or more carbons that are solids at room temperature (LCH). These are dissolved in short chain alkane liquids of length 16 or less (SCH). The mass ratio of long chain to short chain, SCH:LCH, is in a range of 10:1 to 20:1. This liquid alkane mixture was then added into the water with supplemental heat and then the liquid ingredients were added into the dry ingredients with stirring. The wet polymer was then poured into mini-cube trays and allowed to set for 48 hours.

An emulsifying agent was also optionally added to the liquid to prevent phase separation of the alkanes from water and to promote uniform distribution of leach reduction agent. Exemplary emulsifier for this purpose was glycerin. Mechanical mixing with a high speed laboratory blender was also employed to keep the alkanes fully mixed in some tests.

The use of an emulsifying agent and proper mixing were found to be highly beneficial. In the absence of mixing, the alkanes separated from the water. If the ash were to be first wetted with an alkane, the water was shed and unable to react with the aggregate. If the ash were to be first wetted with water, the alkane was shed and unable to react with the aggregate. To overcome these problems, an emulsion and good mixing were employed. In this manner, the water reacts with the aggregate components and the alkane became trapped in pores of the agglomerate.

A benchtop mechanical press instrumented with a digital force gauge was used to determine average crush strength for both pellet and the mini-cube test specimens. The initial break point measured in lb/f was determined as an average of 30 cubes or pellets. The larger intact pieces remaining from this test were then used for moisture absorption testing.

Mortar cube samples were tested for absorption of water into the solids by liquid immersion using ASTM Test Method C128-07a for concrete aggregate. Formed solids were placed in sealed Le' Chatelier volumetric flasks. Cube samples were broken to a size that would fit in the neck of the flask, pre-weighed, and inserted into the flasks. The cube fraction size was ¼" to ⅜" by mechanical sieving. Samples were immersed in neutral pH deionized water filled to a reference level. Liquid levels in the flasks were recorded after one hour and again after 24 hours. The test yielded moisture uptake by the sample in mg/liter after 1 hour and after 24 hours.

A series of fly ash polymers with Class C fly ash were mixed in the laboratory according to the disclosure and cured in small mortar cube size. After curing, they were tested for initial compressive strength using a digital force gauge and mechanical press and then tested for moisture absorption by ASTM C128a. The digital force gauge upper limit was 200 lb.

The samples had identical mix composition except for the inclusion of leach reduction additive and liquid emulsifier in some tests. Waterproofing additive for all the tests was an alkane mixture of LCH (0.2% of dry mix) dissolved in SCH (2.9% of dry mix). The emulsifier was glycerin (0.4% of dry mix) added dropwise to mix water and liquid alkanes.

A laboratory mixer with either low or high rotary speed was used to stir the fly ash polymer mixes in some of the tests. The laboratory mixer had a minimum speed of 500 rpm to a maximum speed of 37,000 rpm.

The order of addition of ingredients was: first, LCH alkanes were added to the SCH alkane-containing liquid solvent; second, the LCH/SCH alkaline-containing liquid was added to the mix water to form a mixing liquid; third the emulsifier was added dropwise to the mixing liquid while the mixing liquid was being stirred stirring; and lastly the mixing liquid was added to dry ingredients.

High moisture penetration is related to permeability and is undesirable for some applications. Leach reduction additives as disclosed reduced the moisture penetration by as much as 50% as measured by 24-hour moisture absorption. The optimum condition was use of an emulsifier combined with continuous low speed mixing. High speed mixing with emulsifier resulted in some phase separation of the alkane mixture from the mix solution. All samples had adequate crush strength, indicating that the addition of emulsifier did not negatively affect the fly ash polymerization.

TABLE 1

Waterproofing, Emulsifier and Mixing Test Results

| Sample | Condition | Alkane Waterproof Additive | Emulsifier | Mixing Technique | Mix Water (Wt. % of Total) | 1-Hour Moisture (ml/g) | 24-Hour Moisture (ml/g) | Crush Strength (lb-force)[3] |
|---|---|---|---|---|---|---|---|---|
| 1 | Baseline w/hand mix | | | Hand Mix | 24 | 0.046 | 0.071 | >200 |
| 2 | Baseline w/high speed mix | | | High Speed | 24 | 0.055 | 0.075 | 198.6 |
| 3 | Baseline w/emulsifier, hand mix | | X | Hand Mix | 24 | 0.037 | 0.063 | 197.6 |

TABLE 1-continued

Waterproofing, Emulsifier and Mixing Test Results

| Sample | Condition | Alkane Waterproof Additive | Emulsifier | Mixing Technique | Mix Water (Wt. % of Total) | 1-Hour Moisture (ml/g) | 24-Hour Moisture (ml/g) | Crush Strength (lb-force)[3] |
|---|---|---|---|---|---|---|---|---|
| 4 | Alkanes w/o emulsifier, low speed mix | X | | Low speed | 22 | 0.031 | 0.053 | 198.4 |
| 5 | Alkanes w/emulsifier, low speed mix | X | X | Low speed | 22 | 0.015 | 0.033 | >200 |
| 6 | Alkanes w/emulsifier, high speed mix | X | X | High Speed | 22 | 0.020 | 0.040 | >200 |

Example 4

Encapsulation of Brine Salt Waste by Pelletization

Pellets incorporating a brine salt waste with spiked heavy metals were formulated by three different methods in a bench-scale rotary pan pelletizer. The pellets were then tested for crush strength, moisture absorption and leaching of chlorides, arsenic, mercury and selenium. A Class C fly ash was combined with dry waste solids to form pellets in two batch runs, F2 and F5. In the third batch, F8, only waste solids were pelletized. The waste solids contained 14.2% chlorides as calcium chloride salt. A liquid binding agent consisting of 28% calcium polysulfide solution was pre-mixed with atomization water and sprayed on the dry ingredients in the rotary pan. The total liquid sprayed was weighed before and after each batch to determine the water and binding agent applied.

In pellet run F2, pre-weighed waste solids were placed in the pan and rotated at set speed and angle while spraying the water/binding agent mixture. Once well-defined spherical pellets had formed, a measured amount of powdered Class C fly ash was added into the pan while continuing rotation and spray. This resulted in a two layer pellet consisting of a waste solid inner core and a fly ash polymerized outer shell. In pellet run F5, a pre-weighed amount of waste solids and Class C fly ash were well mixed and placed in the rotary pan. The liquid water with binding agent was then sprayed onto the dry ingredients while rotating at set speed and drum angle. This formed a homogenous solid pellet. In pellet run F8, only waste solid was used, with the same procedures. All runs were continued until the largest pellets were still less than ⅜" diameter. The drum was set to 35° angle and the speed was set to setting 70 out of 100. Spraying was controlled by timer; 30 seconds off and 1 second on. On average, it took 20 minutes to make pellets with maximum size of ⅜" diameter.

The waste solids and samples of pellets were finely ground and well mixed for chemical analysis of metals and chloride content. Arsenic and selenium were analyzed by EPA Method 6010B (Cold Vapor Atomic Absorption). Mercury was analyzed by EPA Method 7471A, also CVAA. Chlorides were analyzed by EPA Method 4500. Results are given in Table 2. Leaching of the pellets was performed by two different methods, the EPA regulatory Toxicity Characteristic Leaching Procedure (TCLP) and the Synthetic Groundwater Leaching Procedure (SGLP). The SGLP leachate was analyzed after 18 hours continuous agitation and then again after 30 days continuous agitation. The formed pellets were sieved to a size range from ¼" diameter to ⅜" diameter for moisture absorption, crush testing and leach testing. Moisture absorption for these pellets was relatively high since no leach reduction additives were used. Crush strength of the F2 and F8 fly 1:1 ash/waste batches was 4.9 and 15.3 lbs force. The homogeneous mix F5 was stronger but both were acceptable. The F8 pellets made from the waste solid only disintegrated within 24 hours in water and failed at only 0.9 lbs force. All of the pellets incorporated high percentage waste solids.

Table 2 summarizes the batch composition, analytical and leaching results. TCLP leachate metals concentration was below detection for arsenic and selenium for all pellet batches and lower than the waste solid sample. Mercury was not analyzed. Chloride leaching was reduced by 66% and 76% for F2 and F5 respectively.

TABLE 2

Pelletization Test Summary

| Sample | Waste Solids | F2 | F5 | F8 |
|---|---|---|---|---|
| Pellet Type | Dry, high chloride FGD wastewater residue | PRB/Binder outer, Waste solids core, two layer "gobstopper" | PRB/Waste Solids/Binder, homogeneous mixture | Waste Solids/Binder, homogeneous mixture |
| Moisture Absorption 1 Hour (ml/g) | n/a | 0.10 | >0.12 | disintegrates |
| Moisture Absorption 24 Hour (ml/g) | n/a | disintegrates | disintegrates | disintegrates |
| Crush Strength (lb/force, avg. 30 pellets) | n/a | 4.9 | 15.3 | 0.9 |
| ZLD Solids Content (% dry basis) | 100 | 48 | 48 | 94.7 |
| Class C Fly Ash (% dry basis) | 0 | 48 | 48 | 0 |
| Total Liquid Added (% of total mix) | n/a | 17 | 17.3 | 26.8 |
| Binder Added (% of dry mix) | n/a | 4% | 4% | 5.3% |

TABLE 2-continued

Pelletization Test Summary

| Sample | Waste Solids | F2 | F5 | F8 |
|---|---|---|---|---|
| Concentration in Solids (ug/g) | | | | |
| As | 341 | 156 | 170 | 291 |
| Hg | 1.66 | 0.69 | 0.89 | 1.61 |
| Se | 24.7 | 11.5 | 14.3 | 20.8 |
| Chlorides | 142,000 | 46,700 | 57,400 | 65,300 |
| TCLP Leach (mg/L) | | | | |
| As | 1.68 | <0.2 | <0.2 | <0.2 |
| Hg | <0.05 | — | — | — |
| Se | 0.37 | <0.05 | <0.05 | <0.05 |
| Chlorides | 4,360 | 1,490 | 1,060 | 638 |
| SGLP Leach (18 Hour, mg/L) | | | | |
| As | n/a | <0.05 | <0.05 | 0.38 |
| Hg | n/a | <0.005 | <0.005 | <0.005 |
| Se | n/a | <0.05 | <0.05 | 0.059 |
| Chlorides | n/a | 1,750 | 1,630 | 3,860 |
| SGLP Leach (30 day, mg/L) | | | | |
| As | n/a | <0.05 | <0.05 | 0.51 |
| Hg | n/a | <0.005 | <0.005 | <0.005 |
| Se | n/a | <0.05 | <0.05 | 0.06 |
| Chlorides | n/a | 1,930 | 2,650 | 3,870 |

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An agglomerate, comprising:
   a fly ash base material;
   a binding agent comprising a polysulfide binding agent and cement, wherein the polysulfide binding agent comprises one or more of an alkali metal polysulfide, an alkaline earth metal polysulfide, and an organic polysulfide, wherein the agglomerate comprises no more than about 2.5 wt. % cement; and
   a leach reduction additive different than the polysulfide binding agent, wherein the leach reduction additive comprises one or more of a liquid alkane, kerosene, paraffin wax, paraffin oil, lamp oil, a fatty acid ester, stearic acid, oleic acid, palmitic acid, a glyceryl fatty acid ester, alkenes, cycloalkanes, methyl cellulose, long chain alkane hydrocarbons with 20 or more carbons, silicone, and of a trihydroxy alcohol ester of one or more of stearic acid, oleic acid and palmitic acid.

2. The agglomerate of claim 1, wherein the fly ash base material is an aluminosilicate ash base material, wherein the aluminosilicate ash base material comprises a Class F and/or Class C fly ash, wherein the agglomerate comprises about 50 wt. % or more of the aluminosilicate ash base material, wherein the aluminosilicate ash base material includes at least about 500 ppm heavy metals and at least about 1 ppm of a halogen-containing compounds, and further comprising:
   a flue gas desulfurization solid from the reaction of a flue gas desulfurization agent and an acid gas.

3. The agglomerate of claim 2, wherein the flue gas desulfurization solid is one or more of an alkali metal sulfate, an alkaline earth metal sulfate, an alkali metal sulfite, an alkaline earth metal sulfite, an alkali metal nitrate, an alkaline earth metal nitrate, an alkali metal nitrite, an alkaline earth metal nitrite, an alkali metal halide, and an alkaline earth metal halide and wherein the fly ash base material comprises a product of the reaction of the flue gas desulfurization agent and the acid gas.

4. The agglomerate of claim 1, wherein the agglomerate comprises at least about 0.1 wt. % but no more than about 20 wt. % of the binding agent.

5. The agglomerate of claim 1, further comprising at least about 1 wt. % of an added base stabilizer.

6. The agglomerate of claim 1, further comprising at least about 0.1 wt. % but no more than about 5 wt. % of a set retardant.

7. The agglomerate of claim 1, wherein the leach reduction additive is a long chain alkane hydrocarbon with 20 or more carbons and wherein the agglomerate contains at least about 0.001 wt. % but no more than about 5 wt. % of the long chain alkane hydrocarbon.

8. The agglomerate of claim 1, further comprising at least about 0.001 wt. % of an emulsifying agent that is at least one of a latex, sugar ether, quaternary amine, an ammonium salt of a sulfated fatty alcohol ethoxylate, an ethoxylated primary amine, a nonylphenol, a lignon sulfonate, and glycerin.

9. The agglomerate of claim 1, further comprising at least about 0.001 wt. % of a reducing agent capable of providing one or more electrons to another agent.

10. The agglomerate of claim 1, wherein the fly ash base material comprises at least about 1 wt. % activated carbon.

11. An agglomerate, comprising:
an aluminosilicate base material;
a binding agent comprising a polysulfide binding agent and cement, wherein the agglomerate comprises no more than about 2.5 wt. % cement; and
a flue gas desulfurization solid from the reaction of a flue gas desulfurization agent and an acid gas.

12. The agglomerate of claim 11, wherein the aluminosilicate base material comprises a Class F and/or Class C fly ash, wherein the agglomerate comprises about 50 wt. % or more of the aluminosilicate base material, wherein the aluminosilicate base material includes at least about 500 ppm heavy metals, at least about 1 ppm halogen-containing compounds, and a flue gas desulfurization solid from the reaction of a flue gas desulfurization agent and an acid gas.

13. The agglomerate of claim 12, wherein the flue gas desulfurization solid is one or more of an alkali metal sulfate, an alkaline earth metal sulfate, an alkali metal sulfite, an alkaline earth metal sulfite, an alkali metal nitrate, an alkaline earth metal nitrate, an alkali metal nitrite, an alkaline earth metal nitrite, an alkali metal halide and an alkaline earth metal halide and wherein the aluminosilicate base material comprises a product of the reaction of the flue gas desulfurization agent and the acid gas.

14. The agglomerate of claim 11, wherein the polysulfide binding agent comprises an alkali metal and/or alkaline earth metal polysulfide, wherein the polysulfide binding agent comprises an inorganic polysulfide and/or organic polysulfide, and wherein the agglomerate comprises at least about 0.1 wt. % but no more than about 20 wt. % of the polysulfide binding agent.

15. The agglomerate of claim 11, further comprising at least about 1 wt. % of an added base stabilizer.

16. The agglomerate of claim 11, further comprising at least about 0.1 wt. % but no more than about 5 wt. % of a set retardant.

17. The agglomerate of claim 11, further comprising a leach reduction additive, wherein the leach reduction additive comprises one or more of a liquid alkane, kerosene, paraffin wax, paraffin oil, lamp oil, a fatty acid ester, stearic acid, oleic acid, palmitic acid, a glyceryl fatty acid ester, alkenes, cycloalkanes, methyl cellulose, long chain alkane hydrocarbons with 20 or more carbons, silicone, and a trihydroxy alcohol ester of one or more of stearic acid, oleic acid and palmitic acid.

18. The agglomerate of claim 17, wherein the leach reduction additive is a long chain alkane hydrocarbon with 20 or more carbons and wherein the agglomerate contains at least about 0.001 wt. % but no more than about 5 wt. % of the long chain alkane hydrocarbon.

19. The agglomerate of claim 17, further comprising at least about 0.001 wt. % of an emulsifying agent that is at least one of a latex, sugar ether, quaternary amine, an ammonium salt of a sulfated fatty alcohol ethoxylate, an ethoxylated primary amine, a nonylphenol, a lignon sulfonate, and glycerin.

20. The agglomerate of claim 11, further comprising at least about 0.001 wt. % of a reducing agent.

21. The agglomerate of claim 11, wherein the aluminosilicate base material comprises at least about 1 wt. % activated carbon.

22. A method for solidifying a fly ash polymer comprising:
receiving an aluminosilicate fly ash base material separated from a waste gas stream; and
contacting the aluminosilicate fly ash base material with water, a binding agent comprising cement and a polysulfide binding agent, and a leach reduction additive to form an agglomerate, wherein the agglomerate comprises no more than about 2.5 wt. % cement, wherein the polysulfide binding agent comprises one or more of an alkali metal polysulfide, an alkaline earth metal polysulfide and an organic polysulfide, wherein the leach reduction additive is different than the binding agent, and wherein the leach reduction additive comprises one or more of a liquid alkane, kerosene, paraffin wax, paraffin oil, lamp oil, a fatty acid ester, stearic acid, oleic acid, palmitic acid, a glyceryl fatty acid ester, cycloalkanes, methyl cellulose, long chain alkane hydrocarbons with 20 or more carbons, silicone, a trihydroxy alcohol ester of one or more of stearic acid, oleic acid and palmitic acid.

23. The method of claim 22, wherein the aluminosilicate fly ash base material comprises a Class F and/or Class C fly ash, wherein the agglomerate comprises about 50 wt. % or more of the aluminosilicate fly ash base material, wherein the base material includes at least about 500 ppm heavy metals, at least about 1 ppm halogen-containing compounds, and a flue gas desulfurization solid from the reaction of a flue gas desulfurization agent and an acid gas.

24. The method of claim 23, wherein the flue gas desulfurization solid is one or more of an alkali metal sulfate, an alkaline earth metal sulfate, an alkali metal sulfite, an alkaline earth metal sulfite, an alkali metal nitrate, an alkaline earth metal nitrate, an alkali metal nitrite, an alkali metal halide and an alkaline earth metal halide and wherein the aluminosilicate fly ash base material comprises a product of the reaction of the flue gas desulfurization agent and the acid gas.

25. The method of claim 22, wherein the agglomerate comprises at least about 0.1 wt. % but no more than about 20 wt. % of the binding agent.

26. The method of claim 22, wherein the aluminosilicate fly ash base material is contacted with at least about 0.1 wt. % but no more than about 5 wt. % of a set retardant.

27. The method of claim 22, wherein the leach reduction additive comprises:
a long chain alkane hydrocarbon with 20 or more carbons; and
at least about 0.001 wt. % but no more than about 5 wt. % of the agglomerate and wherein the aluminosilicate fly ash base material is contacted with at least about 0.001 wt. % of an emulsifying agent that is at least one of a latex, sugar ether, quaternary amine, an ammonium salt of a sulfated fatty alcohol ethoxylate, an ethoxylated primary amine, a nonylphenol, a lignin sulfonate, and glycerin.

28. The method of claim 27, wherein the contacting step comprises the substeps:
contacting the long chain alkane hydrocarbon with an alkane-containing liquid solvent to form an alkane mixture, wherein the alkane in the alkane-containing liquid solvent has a chain length of 16 or less carbon atoms;
while mixing, contacting the alkane mixture with water to form an aqueous alkane mixture;
while mixing, contacting the aqueous alkane mixture with an emulsifying agent to form a liquid mixture;
contacting the liquid mixture with the aluminosilicate fly ash base material to form an aggregate mixture; and
curing the aggregate mixture to form the agglomerate.

29. The method of claim 28, wherein the rotational speed of a mixer during mixing is at least about 50 rpm but no more than about 40,000 rpm.

30. The method of claim 22, wherein the agglomerate comprises at least an inner layer and outer layer, wherein the inner layer comprises a leachable waste solid, wherein the outer layer surrounds the inner layer and wherein the outer layer comprises the aluminosilicate fly ash base material, the binding agent and leach reduction additive.

31. The method of claim 22, wherein, in the contacting step, the aluminosilicate fly ash base material is contacted with a spray solution of water to form substantially homogeneous pellets.

32. The method of claim 31, wherein the spray solution comprises a liquid waste slurry.

33. The method of claim 22, wherein the binding agent comprises an alkali metal polysulfide and/or alkaline earth metal polysulfide.

* * * * *